United States Patent Office 3,447,391
Patented June 3, 1969

3,447,391
VARIABLE SPEED GEARS
Derek B. Hargreaves, Wych Cottage, Wych Lane, Adlington, near Macclesfield, England; Eric Staniforth, Wood End Farm, Kerridge Road, Rainow, Macclesfield, England; and Roy Goostrey, 20 Sandringham Road, Hurdsfield, Macclesfield, England
Filed Sept. 28, 1966, Ser. No. 582,664
Int. Cl. F16h 29/12
U.S. Cl. 74—125.5            6 Claims

ABSTRACT OF THE DISCLOSURE

Speed gearing having ratio which may be varied continuously, includes plurality of one-way clutches on output shaft, same number of cams on input shafts, and one follower roller engaging each cam. Each follower roller transmits cam movement to a one-way clutch via a drive member, cams being arranged to operate clutches in sequence to provide continuous movement of output shaft. Follower rollers supported by fork-like lever swingable about input shaft, rollers being slidable along length of lever. Lever may be temporarily fixed in various positions of adjustment to alter relative location of roller axes and thereby vary effective lengths of clutch drive members.

---

This invention relates to variable speed gears and is particularly, but not exclusively, applicable to distributors for use in the laying of granular, powdered or like dry materials on the ground for horticultural, agricultural or similar purposes, such as roadmaking where it is desired to lay a swath of the material at a predetermined rate, measurable in units of weight per given area, or to a specified thickness in the case of roadmaking, top dressing, etc. Such uses normally involve only relatively low speeds and relatively low torque loads.

For the aforesaid requirements it is necessary to be able to adjust the distributor over a wide range of rates of delivery and with a fairly high degree of accuracy, especially for example in horticulture for distributing highly concentrated chemical fertilizers of a dry but free-flowing character.

There are many known distributors for such materials which operate with a suitable degree of accuracy and in which the rate of distribution is variable by one means or another but so far as is known none of them uses a continuously variable speed drive between the ground wheels or other source of drive and the distributor mechanism for effecting accurate adjustment of the rate of distribution, and the present invention is based on the appreciation that a variable speed gear method of obtaining variation of rate of distribution is fundamentally desirable, provided a suitable various speed gear is available or can be evolved to give continuous variation or a large number of steps of variation over a substantially wide range. Such range can of course be shifted up or down by further change speed gearing to extend the overall range of variability.

An object of the present invention, based on such appreciation of the fundamental factor aforesaid is to provide a new construction of variable speed gear which is simple and sufficiently robust in construction for its intended duty as well as cheap to manufacture and maintain, even under the rough and unskilled treatment which it may be expected to receive.

According to the invention, a variable speed gear comprises a plurality of uni-directional clutches arranged to drive a common output shaft, an operating lever member for each clutch, an operating shaft and a plurality of cams thereon, each cam being associated with one said lever member and being adapted to actuate its lever member a given amount for each revolution of the operating shaft and through its associated clutch to rotate the output shaft through a given angle, each cam being arranged to permit return movement of its lever member during the said revolution of the operating shaft, the cams being disposed substantially equiangularly to each other around the axis of the operating shaft so that for substantially uniform rotation of the operating shaft so that for substantially uniform rotation of the latter shaft the output shaft is caused to rotate by a series of movements which together result in substantially continuous rotation, and means for varying the effective amounts of actuation of the lever members by the cams whereby the relative rates of rotation of the said output shaft and said operating shaft may be varied.

Preferably, the means for varying the amounts of actuation of the lever members comprise roller means interposed between each cam and its associated lever means, the axes of said roller means being adjustable relative to the axis of the operating shaft by common adjusting means, the position of the adjusting means, providing the setting of the particular ratio of relative rotation of the output and operating shafts.

When the variable speed gear according to the invention is in use care must be taken that the lead factor on the variable speed mechanism due to cyclic fluctuations of speed at the output end of the mechanism must not be such as to give rise to stresses likely to cause undue wear in the transmission itself. Cyclic fluctuation of speed of the output shaft has of course to be taken into account in any projected use of the gear. For the particular use which the gear according to the invention was devised, i.e. that of operating a distributor as described above, there are various factors to be taken into consideration which indicate a fairly wide tolerance for cyclic fluctuation in the rate of delivery of the distributor. Thus there is variation of wheel-to-ground slip of the wheels driving the operating shaft; also there is the tolerance range for distribution of the material being distributed, which is a factor made available by the makers or suppliers of the particular material and yet again the delivery factor variations of the material relative to the particular distributor under different ground speeds and conditions of the material.

An embodiment of the invention will now be described by way of example with reference to the accompanying drawings in which.

Figure 1:
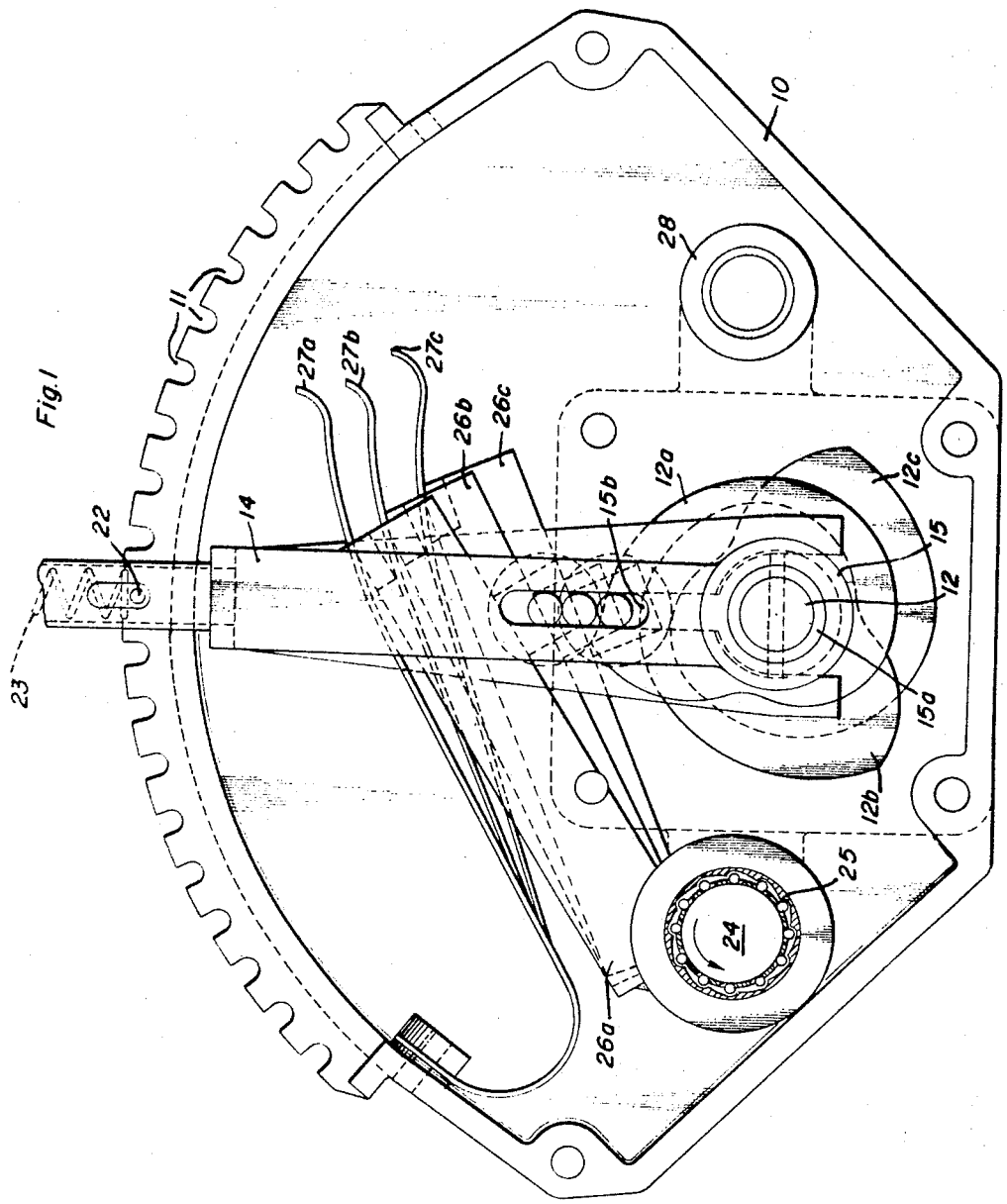
FIG. 1 is a side elevation of one example of a variable speed gear made in accordance with the present invention, the cover being removed to show the mechanism.
Figure 2:
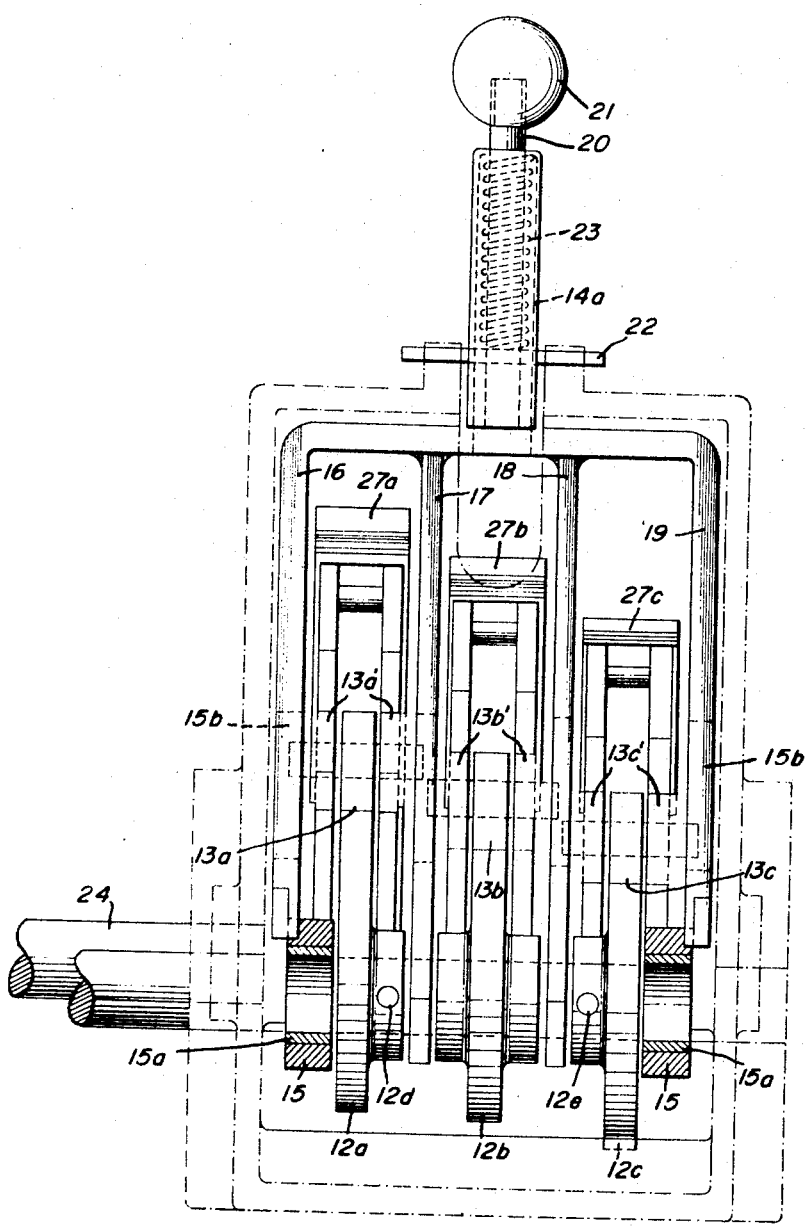
FIG. 2 is an end elevation of the mechanism of FIG. 1 with the gear case shown only in chain line.
Figure 3:
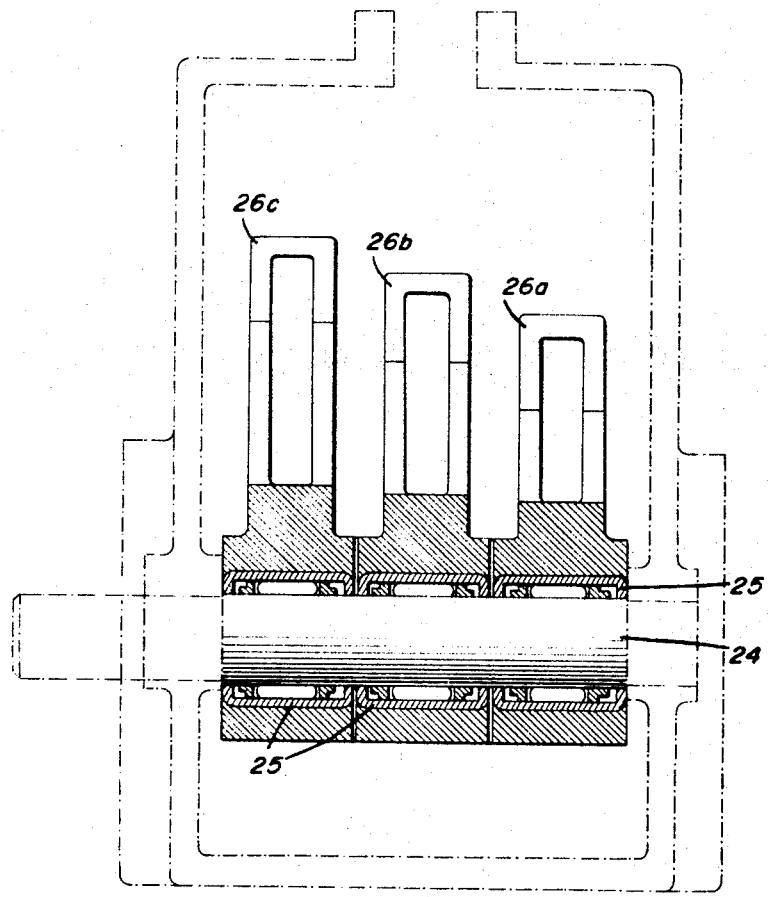
FIG. 3 is a cross-sectional view taken along the longitudinal axis of the output shaft, the gear case being shown only in chain line.

As shown in the drawing, the variable speed gear comprises a casing 10 with detachable cover (not shown) of generally truncated sector shape. The casing is formed with a pair of arcuate notched racks 11 the arc being struck about the axis of an input shaft 12. On said shaft 12 is secured a cluster of three cams 12a, 12b and 12c, all of the same shape and designed for "constant rise" with a slight tapering off to enable one cam to leave its follower as the next takes over. The cam cluster is shown as a single unit secured to the shaft by a pair of grub screws 12d, 12e. The cams are located at an angle of 120 degrees to each other.

Complementary to each cam is a cam roller 13a, 13b and 13c respectively each having trunnions at each side on which are rotatably mounted pairs of trunnion rollers 13a′, 13b′ and 13c′ respectively which are of slightly larger diameter than the cam follower rollers. These trunnions extend beyond the trunnion rollers for slidable location in guides in a control lever as described below.

A control lever 14 for adjusting the effective gear ratio is of four-prong construction, the outer prongs having their ends welded to bosses 15 fitted with bushes 15a which are journaled on the shaft 12. The outer prongs 16 and 19 are formed with slots 15b to form guides for the outer ends of the trunnions aforesaid for the cam follower rollers 13a and 13c. The inner prongs 17 and 18 are similarly slotted to form guides for the adjacent trunnion ends and at their lower ends are shaped to embrace hubs between the cams and formed as part of the cam complex. In the stem 14a of the control lever is mounted a plunger 20 carrying a knob 21 at its upper end and a cross pin 22 the ends of which are adapted to engage with the notches in the racks 11, under the action of a spring 23.

An output shaft 24 is journaled in the casing and is fitted with three roller-cam uni-directional clutches 25 to the housing of each of which is attached a lever 26a, 26b, 26c respectively of duplex construction complementary to the pairs of trunnion rollers 13a', 13b' and 13c' aforesaid. Complementary to each said duplex lever is a leaf spring 27a, 27b and 27c operating as a return spring. Alternative bearing bosses 28 are provided in the casing and cover to receive the output shaft where the opposite direction of rotation is required. The clutches may be those supplied under the name Torrington drawn up roller clutches by the Torrington Company, Torrington, Connecticut, U.S.A.

In operation, the levers 26a, 26b and 26c are moved in sequence by their respective cams through the roller cam followers and trunnion rollers, the trunnion rollers rolling against the underfaces of the levers while rising and falling in the guide slots of the control lever 14. After each lever has reached its maximum degree of travel and discontinues to drive the output shaft, the cam shape allows it to be returned by its spring 27. The unidirectional clutches 25 therefore operate consecutively to impart rotation to the output shaft 24. Such rotation, with a constant rise cam contour may have a saw-tooth characteristic which is more pronounced in some positions of the lever than in others, but these fluctuations can be smoothed out by suitable design modification of the cam contour and/or by shaping the guide slot in the control lever 14 and/or by shaping the underside of the levers 26 where they form tracks for their respective trunnion rollers.

Movement of the control lever to the left of FIG. 1 increases the angular movement of the levers 26a, 26b and 26c and therefore the angle of rotation imparted to the output shaft for each revolution of the input shaft, while movement to the right reduces the imparted angle of rotation, thus providing a variable gear drive.

For use with a distributor as hereinbefore referred to the input shaft would be associated with land wheels to drive the shaft and the output shaft could in turn drive a roller co-operating with a hopper containing the material to be distributed so as to entrain and deliver quantities of the material. Variation of speed setting of the gear would then vary the quantities of material delivered.

We claim:
1. A variable speed gear comprising an output shaft, a plurality of uni-directional clutches arranged on said output shaft, a lever for driving each clutch, an operating shaft, a plurality of spaced cams on said operating shaft each cam being associated with one of said said levers and being adapted to actuate its lever to drive the associated clutch a predetermined amount for each revolution of said operating shaft to thereby rotate said output shaft through a given angle for each revolution of said operating shaft, each cam being shaped to permit return movement of its respective lever during a portion of the revolution of said operating shaft, the cams being disposed with their high points substantially equiangularly spaced with respect to each other around the axis of said operating shaft so that, for substantially uniform rotation of the latter shaft, said output shaft is caused to rotate by a series of movements which together result in substantially continuous rotation, ratio-varying means common to all said driving members, and cam follower means interposed between each cam and the lever of its associated clutch, said cam follower means being mounted on said ratio-varying means, said ratio-varying means being adapted to be moved about the axis of said output shaft so as collectively to vary the effective lengths of said levers, whereby the amounts by which each clutch is driven by its lever for each revolution of said operating shaft may be varied by moving said ratio-varying means thereby changing the ratio between speeds of rotation of the operating and output shafts.

2. A variable speed gear as claimed in claim 1, wherein said ratio-varying means is of fork-like construction, said cam follower means comprising roller means carrying trunnions about which they rotate, and pairs of the prongs of said fork-like member being formed with guides within which said trunnions are slidably supported.

3. A variable speed gear as claimed in claim 2, wherein at least two of the prongs of said fork-like member are adapted to pivot on the said output shaft.

4. A variable speed gear as claimed in claim 1, wherein said ratio-varying means is adapted to provide an infinite variation of ratio of speeds between said operating and output shafts.

5. A variable speed gear as claimed in claim 1, wherein the said levers are each formed as double arm members, each cam follower means being located in a plane between the planes containing the arms of its associated lever.

6. A variable speed gear as claimed in claim 1, including means for positively positioning said ratio-varying means in a number of different settings to select any one of a number of different ratios of speeds between said operating and output shafts.

References Cited

UNITED STATES PATENTS

| | | | |
|---|---|---|---|
| 1,476,766 | 12/1923 | Reynolds | 74—125.5 |
| 2,073,330 | 3/1937 | Zingg | 74—125 |
| 3,340,744 | 9/1967 | Reichl | 74—125 |

FOREIGN PATENTS

| | | |
|---|---|---|
| 368,034 | 4/1963 | Switzerland. |

OTHER REFERENCES

IBM Technical Disclosure Bulletin; R. C. Johnson; vol. 5, No. 10, March 1963, pages 14 and 16.

FRED C. MATTERN, Jr., *Primary Examiner.*

W. S. RATLIFF, Jr., *Assistant Examiner.*